(12) United States Patent
Kim et al.

(10) Patent No.: US 6,380,113 B1
(45) Date of Patent: Apr. 30, 2002

(54) TETRAGONAL ZIRCONIA CERAMIC POWDERS, TETRAGONAL ZIRCONIA-ALUMINA COMPOSITE USING THE CERAMIC POWDER AND METHOD OF PREPARATION FOR THE SAME

(75) Inventors: Dae Joon Kim; Deuk Yong Lee; Ju Woong Jang, all of Seoul (KR)

(73) Assignee: Korea Institute of Science & Technology, Seoul (KR)

( * ) Notice: Subject to any disclaimer, the term of this patent is extended or adjusted under 35 U.S.C. 154(b) by 0 days.

(21) Appl. No.: 09/546,288

(22) Filed: Apr. 10, 2000

(30) Foreign Application Priority Data

May 7, 1999 (KR) .............................................. 99-16356

(51) Int. Cl.[7] .............................................. C04B 35/48
(52) U.S. Cl. ........................ 501/105; 501/103; 501/127; 501/153; 264/666; 264/664
(58) Field of Search ................................. 501/105, 103, 501/127, 153; 264/664, 666

(56) References Cited

U.S. PATENT DOCUMENTS

| | | | |
|---|---|---|---|
| 4,298,385 A | 11/1981 | Claussen et al. | 501/105 |
| 4,316,964 A | 2/1982 | Lange | 501/105 |
| 4,507,394 A * | 3/1985 | Mase et al. | 501/103 |
| 4,533,647 A | 8/1985 | Tien | 501/105 |
| 4,552,852 A | 11/1985 | Manning | 501/105 |
| 4,587,225 A | 5/1986 | Tsukuma et al. | 501/105 |
| 4,659,680 A | 4/1987 | Guile | 501/104 |
| 4,666,467 A | 5/1987 | Matsumoto et al. | 501/105 |
| 4,760,038 A | 7/1988 | Kinney, Jr. et al. | 51/309 |
| 4,829,028 A | 5/1989 | Seki et al. | 501/105 |
| 5,008,221 A * | 4/1991 | Ketcham | 501/103 |
| 5,061,665 A | 10/1991 | Seki et al. | 201/205 |
| 5,556,816 A * | 9/1996 | Kim et al. | 501/103 |

* cited by examiner

Primary Examiner—C. Melissa Koslow
(74) Attorney, Agent, or Firm—Morrison & Foerster LLP

(57) ABSTRACT

The present invention relates to a zirconia/alumina composite and a manufacturing method thereof which provide a zirconia ceramic powder having a composition in a triangle composition range formed of three composition points of 92 mol % $ZrO_2$-4 mol % $Y_2O_3$-4 mol % $Nb_2O_5$ (or $Ta_2O_5$), 89 mol % $ZrO_2$-7 mol % $Y_2O_3$-4 mol % $Nb_2O_5$ (or $Ta_2O_5$), 86 mol % $ZrO_2$-7 mol % $Y_2O_3$-7 mol % $Nb_2O_5$ (or $Ta_2O_5$) in a ternary system of $ZrO_2$—$Y_2O_3$—$Nb_2O_5$ or $Ta_2O_3$ for thereby manufacturing a zirconia/alumina composite having a high strength and high toughness in a state that a low temperature degradation does not occur.

6 Claims, 2 Drawing Sheets

TETRAGONAL ZIRCONIA CERAMIC POWDERS, TETRAGONAL ZIRCONIA-ALUMINA COMPOSITE USING THE CERAMIC POWDER AND METHOD OF PREPARATION FOR THE SAME

BACKGROUND OF THE INVENTION

1. Field of the Invention

The present invention relates to a zirconia ceramic powder and a tetragonal zirconia-alumina composite using the ceramic powder which have a low temperature degradation resistance as well as a high strength and high toughness, and to a method of a preparation for the same, and in detail, to a tetragonal zirconia ceramic powder having a triangle composition range formed of three composition points of 92 mol % $ZrO_2$-4 mol % $Y_2O_3$-4 mol % $Nb_2O_5$ (or $Ta_2O_5$), 89 mol % $ZrO_2$-7 mol % $Y_2O_3$-4 mol % $Nb_2O_5$ (or $Ta_2O_5$), 86 mol % $ZrO_2$-7 mol % $Y_2O_3$-7 mol % $Nb_2O_5$ (or $Ta_2O_5$) in which the composition ratio of the tetragonal zirconia is in the ternary system of $ZrO_2$—$Y_2O_3$—$Nb_2O_5$, or a zirconia/alumina composite comprising the above-described tetragonal zirconia and 5~50% (v/v) alumina and a manufacturing method of the same, which has a low temperature degradation resistance as well as a high toughness and high strength.

2. Description of the Background Art

A pure zirconia has three polymorphic forms of a monoclinic phase, tetragonal phase and cubic phase based on a temperature under an atmospheric pressure. In the case the pure zirconia, it is known to have a cubic phase from a melting point of zirconia to 2370° C. when cooling the same at a high temperature, a tetragonal phase from about 2370° C. to about 1170° C., and a monoclinic phase below 1170° C. When cooling a high temperature tetragonal phase above 1170° C., the phase is transformed to the monoclinic phase at 950° C., so that a volume is expanded by 3~5% for thereby forming cracks over the entire portions of a sintered body. In order to prevent a martensitic phase transformation, an oxide such as MgO, CaO, $Y_2O_3$, $CeO_2$, etc. is added as a stabilizing agent for thereby stabilizing a cubic phase or tetragonal phase which is stable in high temperature. The stabilized Y—TZP(YO-stabilized Tetragonal Zirconia Polycrystalline) in which all ceramic grains are formed in the tetragonal phases by sintering under a condition that the tetragonal phase is stable by adding $Y_2O_3$ is a material having a high strength above 1000 MPa by decreasing the flaw size due to a crystal control effect. However, when this material is exposed at 100~400° C. for a long time, the tetragonal phase is transformed to the monoclinic phase for thereby causing cracks, so that the mechanical characteristics (for example, strength) of the material are degraded. In order to prevent the low temperature degradation phenomenon and strength decrease, an alumina is added into the zirconia for thereby manufacturing a composite. In the case when adding the alumina, the alumina acts to minimize the flaw size and acts as a grain-growth inhibits of the zirconia, so that the zirconia-alumina composite have a high strength compared to the zirconia monolith. Namely, since the strength of the zirconia is in reverse proportional to the grain size, the alumina added into the zirconia prevents a grain growth of the zirconia during a sintering operation for thereby increasing the strength of the tetragonal zirconia.

Various zirconia/alumina ceramics are disclosed. For example, according to the U.S. Pat. No. 4,298,385 by Claussen, it is known that a composite of alumina, zirconia and $HfO_2$ has high toughness. However, in the U.S. Pat. No. 4,298,385, it is difficult to maintain a tetragonal phase as the amount of zirconia is increased, and the grain size of the zirconia must be maintained below 0.5 $\mu$m.

According to the U.S. Pat. No. 4,316,964, a zirconia and alumina composite into which $Y_2O_3$, $CeO_2$, $La_2O_3$, $Eu_2O_3$, etc. are added for stabilizing the tetragonal phase is disclosed by Lange. According to the U.S. Pat. No. 4,533,647, different composition of the alumina/zirconia composite is disclosed by Tien. A zirconia and $HfO_2$ are added into the alumina into which $Cr_2O_3$ is dissolved to increase the phase transformation temperature from the tetragonal phase to the monoclinic phase for thereby increasing the toughness. However, in this patent, it was known later that the toughness was not increased.

According to the U.S. Pat. No. 4,552,852, a composite manufactured by adding a zirconia or $HfO_2$ and glass phase into the alumina is disclosed by Manning. The thusly manufactured material has an increased thermal shock resistance.

According to the U.S. Pat. No. 4,587,225, a zirconia/alumina composite into which $Y_2O_3$ is added by Hot isostatic press method is disclosed by Tsukuma. This composite has a high strength and is sintered for a short time at a lower temperature compared to other composite.

According to the U.S. Pat. No. 4,666,467, a high strength zirconia/alumina composite is disclosed by Matsumoto. The composition of the same is formed of a zirconia 50%~98% added by 1.5~5 mol % $Y_2O_3$ and an alumina or spinel of 50%~2 weight %. According to the U.S. Pat. No. 4,659,680, a method for manufacturing a zirconia which is partially stabilized by adding yttria and implementing a secondary stabilized phase. In this method, the sintered body is quickly cooled from a temperature range of 1000° C.–1475° C. and is maintained for a long time at a temperature at which the zirconia is precipitated inside a cubic grain.

According to the U.S. Pat. No. 4,760,038 by Kinney et al., a composite is manufactured by adding 5~35% $ZrO_2$ as a first additive and 0.25 through 5% $TiO_2$ and $MnO_2$ as a second additive and a third additive respectively using the alumina as a main component. The above-described additives are used to increase a thermal shock resistance of the ceramic composition and prevent a decrease of the strength in a high temperature.

According to the U.S. Pat. No. 4,829,028 by Ichiro, et al., an alumina/zirconia composite having an excellent mechanical strength is manufactured using a Bayer alumina or bauxite for alumina and a vedellate mineral rock for a zirconia. In addition, according to the U.S. Pat. No. 5,061,665 by Ichiro, et al., a molten body is manufactured using the alumina and zirconia and then is rapidly cooled, and at least one ceramic powder selected from the group comprising $CeO_2$ and $TiO_2$ having an average diameter of 0.5 through 1.5 $\mu$m is added to the resultant solid material and is ground and sintered for thereby manufacturing an alumina/zirconia composite. This composite has an excellent strength and thermal shock resistance characteristic depending on the amount of $ZrO_2$, $CeO_2$, and $TiO_2$.

According to the U.S. Pat. No. 5,556,816, a new zirconia among the compositions ternary system of $ZrO_2$—$Y_2O_3$—$Nb_2O_5$ or $Ta_2O_3$, is disclosed. This zirconia has a high toughness and a phase transformation does not occur from the tetragonal phase to the monoclinic phase. However in this patent, the physical strength in which the grain size acts as one of the important factors is very low die to the large grain growth.

As described above, there are various patents and reports on the zirconia/alumina composite for the reason that the zirconia's grain in which the martensitic phase transformation occurs enhances a lower mechanical properties of the alumina, and the alumina having a large Young's modulus restricts the low temperature degradation of the zirconia. However, as shown in FIG. 1, adding the alumina to the tetragonal zirconia does not restrict the low temperature degradation of the tetragonal zirconia under the autoclave processing condition at a temperature of 200° C. and 200 MPa vapor pressure. Only when heat-treating in the air at a temperature of 100~400° C., the low temperature degradation is delayed.

SUMMARY OF THE INVENTION

The present invention is directed to a zirconia/alumina composite and a manufacturing method of the same which provide a high strength and toughness and a low temperature degradation resistance.

Accordingly, it is an object of the present invention to provide a tetragonal zirconia having a triangle composition range formed of three composition points of 92 mol % $ZrO_2$-4 mol % $Y_2O_3$-4 mol % $Nb_2O_5$ (or $Ta_2O_5$), 89 mol % $ZrO_2$-7 mol % $Y_2O_3$-4 mol % $Nb_2O_5$ (or $Ta_2O_5$), and 86 mol % $ZrO_2$-7 mol % $Y_2O_3$-7 mol % $Nb_2O_5$ (or $Ta_2O_5$) in a ternary system of $ZrO_2$—$Y_2O_3$—$Nb_2O_5$ or $Ta_2O_3$ or a zirconia/alumina ceramic powder formed of 5~50% alumina based on a volume ratio with respect to the tetragonal zirconia.

It is another object of the present invention to provide a zirconia/alumina ceramic powder manufacturing method which includes the steps of adding 5~50% alumina based on a volume ratio with respect to the tetragonal zirconia into a tetragonal zirconia ceramic powder having a composition in a triangle composition range formed of 92 mol % $ZrO_2$-4 mol % $Y_2O_3$-4 mol % $Nb_2O_5$ (or $Ta_2O_5$), 89 mol % $ZrO_2$-7 mol % $Y_2O_3$-4 mol % $Nb_2O_5$ (or $Ta_2O_5$), and 86 mol % $ZrO_2$-7 mol % $Y_2O_3$-7 mol % $Nb_2O_5$ (or $Ta_2O_5$) in a ternary system of $ZrO_2$—$Y_2O_3$—$Nb_2O_5$ (or $Ta_2O_3$) and shaping a resultant mixture and sintering a resultant shaped body at a temperature of 1300~1700° C.

The above-described tetragonal zirconia ceramic powder or zirconia/alumina composite has the above-described composition, so that a low temperature degradation is prevented based on a high toughness and high strength. Generally, when there is moisture at an atmospheric pressure, the low temperature degradation more easily occurs. In particular, the degradation is more increased under a certain hard condition such as an autoclave. As shown in FIG. 1, adding the alumina to the tetragonal zirconia does not prevent the low temperature degradation under an autoclave processing condition at a temperature of 200° C. and under 200 MPa vapor pressure. The low temperature degradation is only delayed by processing in the air at a temperature of 100~400° C. for a long time. However, in the case of the tetragonal zirconia ceramic powders and the tetragonal zirconia/alumina composite using the same having the composition according to the present invention, the low temperature degradation does not occur under a certain condition at a temperature of 200° C. and under a pressure of 200 MPa and has a high strength and high toughness. As the alumina is added, it is possible to obtain a stable tetragonal zirconia solid solution, and the toughness is increased due to a crack deflection based on the alumina. The strength is increased by decreasing the grain size. The phase transition from the tetragonal phase to the monoclinic phase is effectively controlled by adding an alumina having a higher elastic modulus compared to the zirconia. Namely, the low temperature degradation is more effectively controlled.

In order to provide a zirconia/alumina composite having the above-described characteristic, when mixing TZP powders, $Y_2O_3$ is added more than the adding amount of $Nb_2O_5$ (or $Ta_2O_5$), and the composition range is determined based on a triangle composition area formed of three composition points of 92 mol % $ZrO_2$-4 mol % $Y_2O_3$-4 mol % $Nb_2O_5$ (or $Ta_2O_5$), 89 mol % $ZrO_2$-7 mol % $Y_2O_3$-4 mol % $Nb_2O_5$ (or $Ta_2O_5$), and 86 mol % $ZrO_2O_3$-7 mol % $Y_2O_3$-7 mol % $Nb_2O_5$ (or $Ta_2O_5$).

The alumina among the zirconia/alumina composite is preferably has a grain size of 0.1~10 μm. If the grain size of the alumina is below 0.1 μm, the toughness enhancing effect by the crack deflection is decreased, and if the grain size is above 10 μm, it is difficult to implement a densification of the zirconia and composite during the sintering process. FIG. 2 illustrates a strength and toughness of the tetragonal zirconia/alumina composite based on the grain size and adding amount of the alumina. The alumina of a larger grain size has a higher toughness compared to the alumina of a smaller grain size. Therefore, it is known that an alumina having a larger grain size is preferred. As shown in FIG. 2, and as described in the example 9–16 of the present invention, the adding amount of the alumina is 5~50% (v/v), preferably, 10~30(v/v) %, and is more preferably 20(v/v) %.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

In FIG. 2, a dotted line represents a breaking toughness; and a full line represents a bending strength. In addition, marks ○ and ● represent alumina having a diameter of 0.2 μm, and an empty triangle and full triangle represent a material formed by adding an alumina having a diameter of 2.8 μm thereto, and an empty circle and triangle and a full circle and triangle represent a breaking-toughness and bending strength, respectively.

DETAILED DESCRIPTION OF THE PREFERRED EMBODIMENTS

Figure 1:
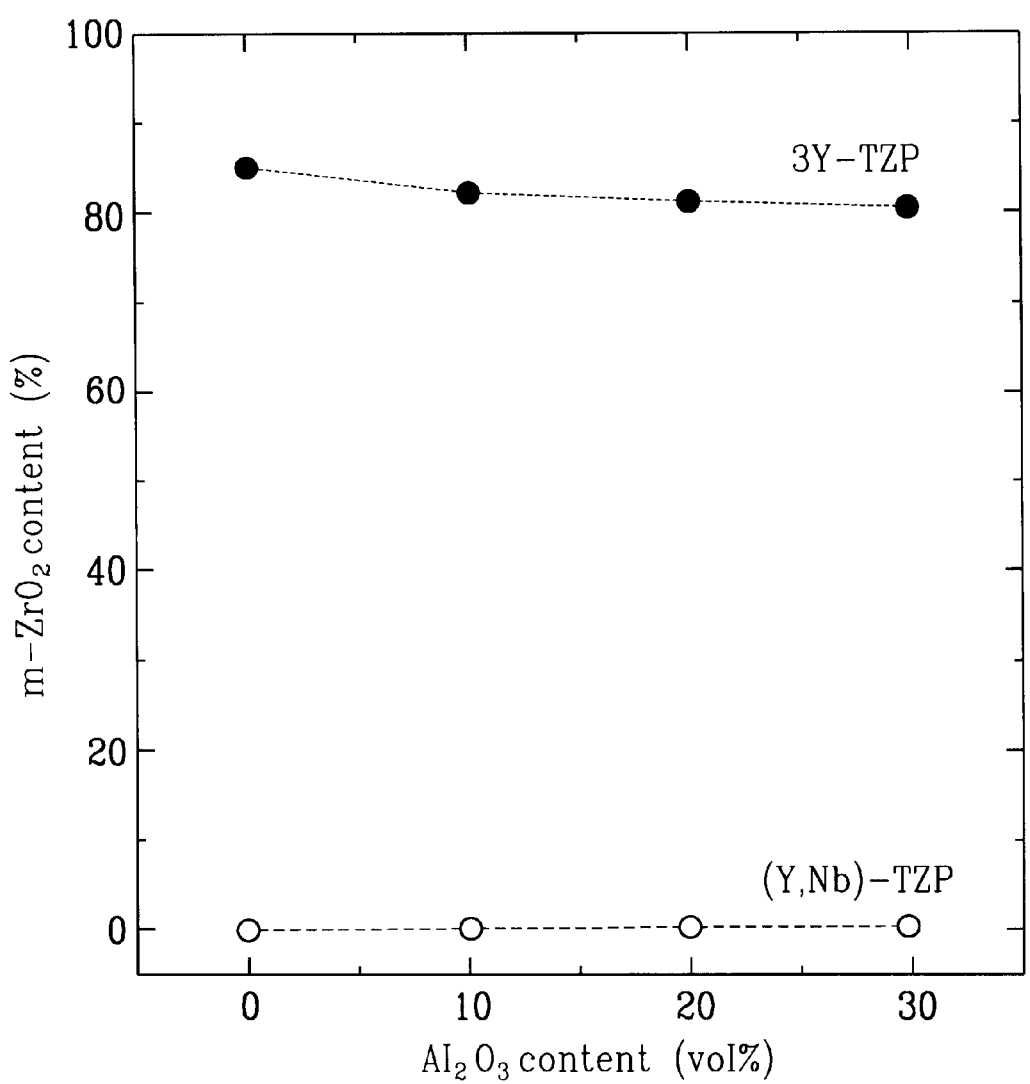
FIG. 1 is a view illustrating a result of a low temperature degradation degree obtained by sintering a composite that an alumina of 10~30% (v/v) is mixed with a TZP(3Y—TZP) stabilized to 3 mol % $Y_2O_3$ and a powder that an alumina is mixed with a TZP((Y, NB)—TZP) stabilized by adding 5.31 mol % $Y_2O_3$ and 4.45 mol % $Nb_2O_5$ at a temperature 200° C. for 5 hours under 4 MPa atmosphere pressure.
Figure 2:
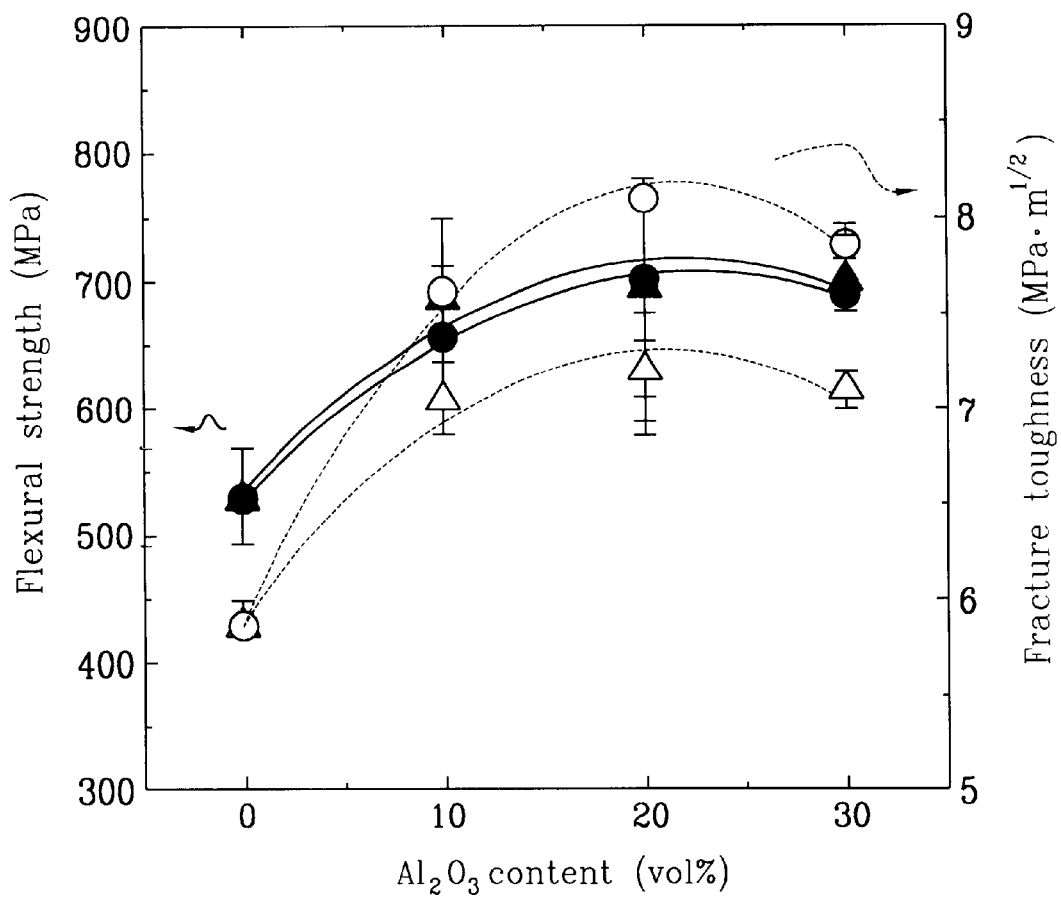
FIG. 2 is a view illustrating a strength and toughness value of a test piece sintered by adding 0.2 μm and 2.8 μm alumina of 10~30 volume % to a TZP((Y, Nb)—TZP) stabilized by adding 5.3 mol % $Y_2O_3$ and 4.45 mol % $Nb_2O_5$.

The present invention relates to a zirconia ceramic powder manufacturing method and a method for fabricating a zirconia/alumina composite having the zirconia ceramic powder. In detail, the present invention relates to a method for manufacturing a zirconia ceramic powder formed by simply mixing a tetragonal zirconia ceramic powder having a certain composition in a triangle composition range formed of three composition points of 92 mol % $ZrO_2$-4 mol % $Y_2O_3$-4 mol % $Nb_2O_5$ (or $Ta_2O_5$), 89 mol % $ZrO_2$-7 mol % $Y_2O_5$ (or $Ta_2O_5$), and 86 mol % $ZrO_{2,1}$-7 mol % $Y_2O_3$-7 mol % $Nb_2O_5$ (or $Ta_2O_5$) or spray-drying the same after mixing the ceramic powder of the above-described compositions, and then forming the dried powder and sintering a resultant material at a temperature of 1300~1700° C.

In addition, the present invention relates to a method for manufacturing a zirconia/alumina composite by simply mixing an alumina with the tetragonal zirconia ceramic powder based on a volume ratio of 5~50% wherein the tetragonal zirconia ceramic powder has a certain composition in a triangle composition range formed of three compositions of 92 mol % $ZrO_2$-4 mol % $Y_2O_3$-4 mol % $Nb_2O_5$ (or $Ta_2O_5$), 89 mol % $ZrO_2$-7 mol % $Y_2O_3$-4mol % $Nb_2O_5$ (or $Ta_2O_5$), 86 mol % $ZrO_2$-7 mol % $Y_2O_3$-7 mol % $Nb_2O_5$ (or $Ta_2O_5$) in the three composition system of $ZrO_2$—$Y_2O_3$—$Nb_{25}$, spray-drying the same after mixing the ceramic powder of the above-described composition, forming the dried powder and then sintering a resultant material at a temperature of 1300~1700° C.

As a method for sintering a molded body for a composite, a method such a-s an atmospheric pressure sintering method or a hot isostatic press method may be used. In the case of the atmospheric pressure sintering, the temperature is increased to 1300° C.~1700° C. by 10° C. per minute at an ambient temperature and pressure and is maintained for 1~10 hours for thereby completing an atmospheric pressure sintering process. Also, in the case of the hot isostatic press method, the sintering process is performed for 1~10 hours at a temperature of 1500~1650° C. at an atmospheric pressure, and then the sintering process is performed for 10 minutes through 2 hours at a temperature of 1300~1600° C. under a pressure of 100 MPa.

In the above-described sintering method, the test piece which is sintered under an atmospheric pressure may be processed based on a hot isostatic press which is performed for 10 minutes to two hours at: a temperature of 1300~1600° C. under 2~200 MPa vapor pressure. In detail, $Y_2O_3$ and $Nb_2O_5$ (or $Ta_2O_5$) are added to the zirconia $ZrO_2$ for thereby fabricating ceramic powders. The thusly obtained powders are heat-treated at a temperature of 1000° C.~1400° C. for 1~10 hours and are ground for thereby obtaining an average grain size of below 40 $\mu$m, so that a tetragonal zirconia(TZP) is obtained. The composite powder formed by mixing the TZP powders and alumina $Al_2O_3$ is formed and sintered at a temperature 1400° C.~1700° C. for thereby manufacturing a composite.

At this time, the grain size of the added alumina is preferably below 10 $\mu$m. In this case, the material is simply mixed before the forming process is performed or is spray-dried after the mixing process is performed.

The examples of the present invention will be explained in detail. The scope of the present invention is not limited the following examples.

EXAMPLES 1–8

In order to manufacture the composite, the powder manufactured by adding $ZrO_2$(Tosoh company, Japan), $Y_2O_3$ (Aldrich company, U.S.A.), $Nb_2O_5$(Aldrich company U.S.A.) or $Ta_2O_5$ company, U.S.A) was heat-treated at a temperature of 1000° C.–1400° C. for 1–10 hours and was ground for thereby obtaining an average grain size of below 40 $\mu$m, so that a tetragonal zirconia(TZP) was manufactured. The alumina having 2.8 $\mu$m grain size was added to the thusly manufactured zirconia by 0–30% (v/v), and ethyal-cohol was provided into a polyethylene container together with zirconia balls and was mixed for 24 hours using the ball mill. The resultant slurry was dried and classified using a mesh of 100 mess, so that the powder was shaped in a disk shape of 25 mm diameter. The resultant formed body was processed by the isostatic press method under a pressure of 140 MPa and was sintered for 2 hours at a temperature of 1550° C. The sintered test pieces were processed by a diamond polishing plate of 1000 grit, so that a disk having a diameter of about 18 mm and a thickness of 1.8 mm was fabricated.

Table 1 illustrates the composition of the tetragonal zirconia.

TABLE 1

| | Tetragonal zirconia composition(mol %) | | | |
|---|---|---|---|---|
| | $ZrO_2$ | $Y_2O_3$ | $Nb_2O_5$ | Adding amount of alumina(vol %) |
| Example 1 | 91 | 5 | 4 | 0 |
| | " | | | 10 |
| | " | | | 20 |
| | " | | | 30 |
| Example 2 | 90.24 | 5.31 | 4.45 | 0 |
| | " | | | 10 |
| | " | | | 20 |
| | " | | | 30 |
| Example 3 | 90.2 | 5.4 | 4.4 | 0 |
| | " | | | 10 |
| | " | | | 20 |
| | " | | | 30 |
| Example 4 | 89.4 | 5.8 | 4.8 | 0 |
| | " | | | 10 |
| | " | | | 20 |
| | " | | | 30 |
| Example 5 | 90 | 6 | 4 | 0 |
| | " | | | 10 |
| | " | | | 20 |
| | " | | | 30 |
| Example 6 | 89.6 | 6 | 4.4 | 0 |
| | " | | | 10 |
| | " | | | 20 |
| | " | | | 30 |
| Example 7 | 89.2 | 6 | 4.8 | 0 |
| | " | | | 10 |
| | " | | | 20 |
| | " | | | 30 |
| Example 8 | 88.8 | 6 | 5.2 | 0 |
| | " | | | 10 |
| | " | | | 20 |
| | " | | | 30 |

EXAMPLES 9–16

Mechanical Characteristics of the Zirconia/alumina Composite According to the Present Invention A circular plate having a diameter of 18 mm and a thickness of 1.8 mm was formed using a composite powder and was sintered for 1 hour at a temperature of 1600° C., and a strength was determined based on a biaxial strength measuring method, and a toughness was computed by an indentation/strength method. A result of the computation is shown in Table 2. A test sample having a composition of the example 1–8 was experimented based on the component composite ratio of the zirconia/alumina composite.

The test sample was heat-treated for 10 hours under an autoclave of 200° C., 2 MPa vapor pressure. The low temperature degradation degree with respect to the test sample was determined by computing the phase transformation amount from the tetragonal phase to the monoclinic phase based on the following Equation with respect to the (111) surface corresponding to the monoclinic phase and the (111) peak surface corresponding to the (111) surface peak area and the tetragonal phase based on a X-ray diffraction method.

$$\text{Phase transformation amount} = \frac{m(111) + m(111)}{(m(111) + m(111) + t(111))} \times 100$$

where m and t represent monoclinic phase and tetragonal phase.

Table 2 represents a phase transformation degree from the tetragonal phase to the monoclinic phase after the test sample was heat-treated for 20 hours under an autoclave of 100° C., 2 MPa pressure with respect to the strength and roughness of the composite. As shown in Table 2, the strength was increased by 15~60%, and the toughness was increased by 8~37% in accordance with the composition by adding alumina to TZP. In addition, as a result, it was known that a low temperature degradation did not occur under the autoclave.

under an atmospherical pressure was checked and compared by the Archimedes method. A result of the comparison is shown in Table 3. As shown therein, the sintering density reached the theoretical value.

TABLE 3

| Added volume of alumina (vol/%) | Atmospheric pressure sintering density (unit) | HIP sintering density (unit) | Strength (MPa) |
|---|---|---|---|
| 0 | 5.92 | 6.05 | 623 |
| 10 | 5.72 | 5.85 | 866 |
| 20 | 5.52 | 5.64 | 926 |
| 30 | 5.32 | 5.43 | 944 |
| 40 | 5.12 | 4.18 | 748 |

EXAMPLE 18

Alumina was added to TZP which was stabilized by adding 5.31 mol % $Ta_2O_5$ and 4.45 mol % $Nb_2O_5$ by

TABLE 2

| | Tetragonal zirconia composition(mol %) | | | added amount of aluminate(vol %) | strength(vol %) | Toughness(MPam$^{1/2}$) | Monoclinic phase amount(%) |
|---|---|---|---|---|---|---|---|
| | $ZrO_2$ | $Y_2O_3$ | $Nb_2O_5$ | | | | |
| Example 9 | 91 | 5 | 4 | 0 | 431 | 6.5 | 30 |
| | " | | | 10 | 617 | 8.4 | 0 |
| | " | | | 20 | 692 | 8.6 | 0 |
| | " | | | 30 | 647 | 8.3 | 0 |
| Example 10 | 90.24 | 5.13 | 4.45 | 0 | 528 | 5.9 | 0 |
| | " | | | 10 | 656 | 7.6 | 0 |
| | " | | | 20 | 700 | 8.1 | 0 |
| | " | | | 30 | 690 | 7.9 | 0 |
| Example 11 | 90.2 | 5.4 | 4.4 | 0 | 466 | 6.0 | 0 |
| | " | | | 10 | 608 | 7.1 | 0 |
| | " | | | 20 | 653 | 7.3 | 0 |
| | " | | | 30 | 670 | 7.4 | 0 |
| Example 12 | 89.4 | 5.8 | 4.8 | 0 | 524 | 5.7 | 0 |
| | " | | | 10 | 591 | 6.7 | 0 |
| | " | | | 20 | 601 | 6.9 | 0 |
| | " | | | 30 | 588 | 7.1 | 0 |
| Example 13 | 90 | 6 | 4 | 0 | 466 | 5.6 | 0 |
| | " | | | 10 | 656 | 6.9 | 0 |
| | " | | | 20 | 672 | 7.3 | 0 |
| | " | | | 30 | 673 | 7.3 | 0 |
| Example 14 | 89.6 | 6 | 4.4 | 0 | 490 | 6.1 | 0 |
| | " | | | 10 | 640 | 7.0 | 0 |
| | " | | | 20 | 601 | 6.6 | 0 |
| | " | | | 30 | 603 | 6.9 | 0 |
| Example 15 | 89.2 | 6 | 4.8 | 0 | 533 | 5.9 | 0 |
| | " | | | 10 | 607 | 6.7 | 0 |
| | " | | | 20 | 628 | 7.3 | 0 |
| | " | | | 30 | 641 | 7.2 | 0 |
| Example 16 | 88.8 | 6 | 5.2 | 0 | 480 | 5.7 | 0 |
| | " | | | 10 | 548 | 6.1 | 0 |
| | " | | | 20 | 631 | 6.5 | 0 |
| | " | | | 30 | 608 | 6.4 | 0 |

EXAMPLE 17

Sintering by a Hot Isostatic Press Method

The test sample, which was manufactured in such a manner that alumina was added to TZP(3Y—TZP) stabilized by adding 3 mol % $Y_2O_35$ or TZP((Y,Nb,)—TZP stabilized by adding 5.31 mol % $Y_2O_3$ and 4.45 mol % $Nb_2O_5$ by 0, 10, 20, 30, 40% (v/v), was heated to a temperature of 1500–1650° C. and was sintered for 1–10 hours and then was sintered for 30 minutes at 1500° C. under 100 MPa. The density of the test sample which was sintered by a hot isostatic press method and sintered at 1550° C.

10–30% (v/v) and was sintered for 2 hours at 1550° C., and a difference between the strength and toughness based on the particle size of the alumina and the added amount is shown in Table 2. In view of the strength and toughness, the added amount of the alumina was increased until 20% (v/v), and was slightly decreased at the added amount which exceeds the above-described amount. In particular, since the toughness value was involved in the size of the alumina, the toughness was increased when adding a large size alumina rather than adding a small side alumina.

COMPARISON EXAMPLE 1

Alumina was added to TZP(3Y—TZP) stabilized by adding 3 mol % $Y_2O_35$ or to TZP((Y, NB)—TZP) stabilized by adding 5.31 mol % $Y_2O_3$, 4.45 mol % and $Nb_2O_5$ by 10–30 vol %, and then was sintered for 2 hours at 1550° C. and was heat-treated for 5 hours under an autoclave of 4 MPa at 200° C. A result of the above-described process is shown in FIG. 1. As shown in FIG. 1, under the above-described condition, 3Y—TZP had a low temperature degradation resistance in a state that the tetragonal phase was transformed to the monoclinic phase irrespective of the amount of alumina. In the composite manufactured by adding, by 20% (v/v), an alumina having a particle size of 2.8 μm to a monolith tetragonal zirconia which was manufactured in such a manner that a zirconia 90.2 mol % which was a composite of (Y,Nb)—TZP/alumina, yttria 5.3 mol % and niobia 4.45 mol % were mixed, the low temperature degradation phenomenon did not occur.

As described above, the present invention relates to a zirconia/alumina composite and a manufacturing method thereof which provides a tetragonal zirconia having a triangle composition range formed of three composition points of 92 mol % $ZrO_2$-4 mol % $Y_2O_3$-4 mol % $Nb_2O_5$ (or $Ta_2O_5$), 89 mol % $ZrO_2$-7 mol % $Y_2O_3$-4 mol % $Nb_2O_5$ (or $Ta_2O_5$), 86 mol % $ZrO_2$-7 mol % $Y_2O_3$-7 mol % $Nb_2O_5$ (or $Ta_{2O5}$). In the present invention providing a zirconia/alumina composite and a manufacturing method thereof, a low temperature degradation resistance was obtained by adding the alumina of 5–50% (v/v) to the tetragonal zirconia for thereby enhancing a strength and toughness of the composite.

Although the preferred examples of the present invention have been disclosed for illustrative purposes, those skilled in the art will appreciate that various modifications, additions and substitutions are possible, without departing from the scope and spirit of the invention as recited in the accompanying claims.

What is claimed is:

1. A zirconia/alumina composite, comprising a tetragonal zirconia ceramic powder comprising a composition in a triangle composition range formed of three composition points of 92 mol % $ZrO_2$-4 mol % $Y_2O_3$-4 mol % $Nb_2O_5$ or $Ta_2O_5$, 89 mol % $ZrO_2$-7 mol % $Y_2O_3$-4 mol % $Nb_2O_5$, 86 mol % $ZrO_2$-7 mol % $Y_2$-7 mol % $Nb_2O_5$ or $Ta_2O_5$ in a ternary system of $ZrO_2$—$Y_2O_3$—$Nb_2O_5$ or $Ta_2O_3$, wherein said composite is formed of ingredients comprising a tetragonal zirconia ceramic powder and an alumina of 5–50% (v/v).

2. The zirconia/alumina composite of claim 1, wherein the amount of said alumina is 10–30% (v/v).

3. The zirconia/alumina composite of claim 1, wherein the particle size of the added alumina is 0.1–10 μm.

4. A zirconia/alumina composite manufacturing method, comprising the steps of:

mixing 5–50% (v/v) of alumina with a tetragonal zirconia ceramic powder having a composition in a triangle composition range formed of three composition points of 92 mol % $ZrO_2$-4 mol % $Y_2O_3$-4 mol % Nb2O$_5$ or $Ta_2O_5$, 89 mol % $ZrO_2$-7 mol % $Y_2O_3$-4 mol % $Nb_2O_5$ or $Ta_2O_5$, 86 mol % $ZrO_2$-7 mol % $Nb_2O_5$ or $Ta_2O_5$ in a ternary system of $ZrO_2$—$Y_2O_3$—$Nb_2O_5$ or $Ta_2O_3$ and shaping a resultant mixture; and sintering a resultant shaped body at a temperature of 1300–1700° C.

5. The method of claim 4, wherein said sintering method is performed under an atmospheric pressure.

6. The method of claim 4, further comprising hot isostatic pressing the sintered body for 10 minutes to 2 hours under 2–200 MPa at a temperature of 1300–1600° C.

\* \* \* \* \*